US007486640B2

(12) United States Patent
Borsos et al.

(10) Patent No.: US 7,486,640 B2
(45) Date of Patent: Feb. 3, 2009

(54) SIGNALING MECHANISM FOR HANDOVER IN DIGITAL BROADCASTING

(75) Inventors: András Borsos, Helsinki (FI); Dominique Müller, Helsinki (FI)

(73) Assignee: Nokia Corporation, Espoo (FI)

( * ) Notice: Subject to any disclaimer, the term of this patent is extended or adjusted under 35 U.S.C. 154(b) by 818 days.

(21) Appl. No.: 10/968,087

(22) Filed: Oct. 20, 2004

(65) Prior Publication Data

US 2006/0084435 A1 Apr. 20, 2006

(51) Int. Cl.
*H04Q 7/00* (2006.01)

(52) U.S. Cl. .................... 370/331; 455/432.1; 455/436; 370/466; 370/474; 370/476; 370/254

(58) Field of Classification Search ................. 370/466, 370/474, 331
See application file for complete search history.

(56) References Cited

U.S. PATENT DOCUMENTS

| | | | | |
|---|---|---|---|---|
| 6,226,278 | B1 | 5/2001 | Bursztejn et al. | 370/328 |
| 6,493,043 | B1 | 12/2002 | Bollmann et al. | 348/714 |
| 6,738,981 | B1 | 5/2004 | Tönnby et al. | 725/98 |
| 6,753,812 | B2 | 6/2004 | Rabinowitz et al. | 342/464 |
| 6,763,035 | B1 | 7/2004 | Koskelainen et al. | 370/466 |
| 6,788,690 | B2 | 9/2004 | Harri | 370/395.2 |
| 2006/0007953 | A1 * | 1/2006 | Vesma et al. | 370/466 |
| 2006/0239299 | A1 * | 10/2006 | Scheid et al. | 370/474 |
| 2006/0262751 | A1 * | 11/2006 | Vermola et al. | 370/331 |
| 2007/0101228 | A1 * | 5/2007 | Vesma et al. | 714/752 |
| 2007/0258487 | A1 * | 11/2007 | Puputti | 370/474 |

* cited by examiner

*Primary Examiner*—David Q Nguyen
(74) *Attorney, Agent, or Firm*—Morgan & Finnegan, LLP

(57) ABSTRACT

A time slicing digital broadcast system includes a dynamic handover process switching a handheld terminal receiving services in a first signal to a second signal providing the same services, while roaming among cells in the digital broadcast system. The terminal takes into account the varying intervals between bursts in the current cell and the target cell. The terminal identifies possible handover signals from a MPE/FEC frame in a data stream. A table in the MPE/FEC frame transmitted once on each transport stream contains the mapping of the real-time handover signaling to the handovers that are possible from signals that are transporting the actual transport stream. The table contains a calculated retune interval specifying the guaranteed interval for the MPE/FEC frame. In another embodiment, the MPE/FEC frame contains MAC addressing bits in the MPE section for real-time parameters in time slicing. The bits may be converted into signaling scenarios for guaranteed handover time.

14 Claims, 13 Drawing Sheets

| Syntax | No. of bits | Indentifier |
|---|---|---|
| handover_signaling_section(){ | | |
| **table_id** | 8 | |
| **section_syntax_indicator** | 1 | |
| **reserved_for_future_use** | 1 | |
| ... | | |
| **section_number** | 12 | |
| **last_section_number** | 12 | |
| **real_time_bits_allocation** 1100 | 4 | |
| **signal_identifier_loop_length** 1102 | 12 | |
| for(i=0;i<N; i++){ | | |
| **original_network_id** 1104 | 16 | |
| **cell_id** | 16 | |
| **transport_stream_id** 1108 | 16 | |
| **signal_id** 1110 | 8 | |
| } | | |
| **ts_signal_loop_length** 1112 | 12 | |
| for(i=0; i<N; i++){ | | |
| **home_signal_id** 1114 | 8 | |
| **handover_identifier_loop_length** 1116 | 12 | |
| for(j=0; j<N; j++){ | | |
| **handover_id** 1118 | 8 | |
| **handover_info_loop_length** 1120 | 8 | |
| for(k=0;k<N;k++){ | | |
| **retune_interval** 1122 | 4 | |
| **target_signal_id** 1124 | 8 | |
| } | | |
| } | | |
| } | | |
| } | | |

FIG. 11

1200

| | Syntax | Number of bits | Mnemonic |
|---|---|---|---|
| | multiprotocol_encapsulation_infor () { | | |
| 1202 | MAC_address_range | 3 | uimsbf |
| 1204 | MAC_IP_mapping_flag | 1 | bslbf |
| 1206 | alignment_indicator | 1 | bslbf |
| 1208 | reserved | 3 | bslbf |
| 1210 | max_sections_per_datagram | 8 | uimsbf |
| | } | | |

FIG. 12

| Syntax | No. of bits | Indentifier |
|---|---|---|
| MPE-HO section() { | | |
| table_id | 8 | |
| section_syntax_indicator | 1 | |
| private_Indicator | 1 | |
| reserved | 2 | |
| section_length | 12 | |
| reserved_for_future_use | 16 | |
| reserved | 2 | |
| reserved_for_future_use | 5 | |
| current_next_indicator | 1 | |
| section_number | 8 | |
| last_section_number | 8 | |
| real_time_parameters() | | |
| for(i=1; i<N; i++){ | | |
| original_network_id 1402 | 16 | |
| cell_id 1404 | 16 | |
| transport_stream_id 1406 | 16 | |
| retune_interval 1408 | 8 | |
| } | | |
| } | | |

SIGNALING MECHANISM FOR HANDOVER IN DIGITAL BROADCASTING

BACKGROUND OF INVENTION

1. Field of Invention

This invention relates to digital broadcasting systems, methods and apparatus. More particularly, the invention relates to improved signaling mechanisms for a digital broadcasting system when a handheld digital broadcast terminal changes frequency, cell, transport stream, network and continues to receive the same services with the new network settings.

2. Description of Prior Art

The structure of one digital broadcast system, Digital Video Broadcasting (DVB) including DVB-H (DVB Transmission system for handheld terminals), in which the present invention is operative is described in European Television Standards Institute (ETSI) EN 301 192 v1.4.1 (2004-06). The structure of one DVB-H receiver in which the present invention is operative is described in (ETSI) EN 300 744 v1.5.1 (2002-06), particularly Annex F. Other digital broadcast systems in which the invention can be operative include Advanced Television Systems Committee (ATSC) and Integrated Services Digital Broadcasting-Terrestrial (ISDB-T), among others.

A wireless digital broadcast system comprises a plurality of base stations that interfaces to a backbone network in order to receive the plurality of data packets from a service source. The plurality of packets comprises a group of data packets that is associated with a data service. Data packets are sent to a wireless terminal by a first base station transmitting a first channel burst and by a second base station transmitting a second channel burst, in which corresponding time offsets of the channel bursts. The amount of phase delay associated with the transmission of channel bursts from each base station is zero. Consequently, when the wireless terminal executes a handover from the first base station to the second base station, a probability is increased that some of the data packets are lost, as result of practical network considerations.

The goal of handover signaling is to tell the terminal how much time is available to hand over from the current burst of the "current elementary stream" to the next burst of a "neighbor elementary stream" (that contains the same "service" [collection of IP flows] as the current elementary stream, but is transmitted in a neighbor cell (the neighbor cell can be part of the same network as the current cell, or even of another network).

Based on this information, a certain terminal (each terminal will know how much time it needs to hand over; a newer generation of terminal might need less time; a simpler terminal might need more time) can judge beforehand whether or not it is able to hand over to the neighbor elementary stream without missing a burst (or part of a burst).

In a fully dynamic time slicing system, where the bandwidth allocation is different in each cell, and the burst interval and duration is therefore optimized independently in each cell, the time that is available for handover will vary unpredictably from burst to burst, in the range from zero to the maximal burst interval in the neighbor cell.

What is needed in the art if handover signaling is to work for such flexible time slicing schemes is a signaling mechanism that is fully dynamic and takes into account the varying intervals between bursts in the current cell and in the neighbor cell. The advantage is that if the time that is available for handing over is signaled dynamically, the terminal can delay the handover (reception conditions in the current cell permitting) until there is enough time available for a certain burst. A terminal with good handover capabilities (needing little time for handover) can hand over more quickly, whereas a terminal with less good handover capabilities (needing more time for handover) might wait for a couple of burst in the current cell (despite worsening reception conditions) until it happens that there is enough time available for handover. If the reception conditions fall below a certain threshold, then such a terminal will hand over anyway, because the packet loss due to slow handover is preferable to the packet loss due to the bad reception conditions.

Prior art related to signaling mechanism in digital broadcast handheld receivers includes:

(1) U.S. Pat. No. 6,788,690 to Harri Sep. 7, 2004 discloses a broadband digital broadcast receiver and methods are provided for processing Internet protocol data. Transport stream packets are analyzed to determine whether they contain Internet protocol data addressed to a desired Internet protocol address. When a transport stream packet does contain the desired Internet protocol data, a transport stream filter is configured to filter additional transport stream packets according to a packet identifier value.

(2) U.S. Pat. No. 6,226,278 Bursztejn, et al. May 1, 2004 discloses a system for radio communication with mobile stations, the system being of the type enabling one or more network operators to manage respective distinct networks. Each network is constituted by geographical cells and has mobile stations traveling there through. Each cell of a given network is associated with a base station through which those mobile stations that are located in the cell and that are subscribers with the operator managing the given network can communicate. In its own network, each operator transmits a pilot data channel supplying each mobile station with pilot data enabling it specifically to log-on to the network. The system further comprises a super-network made up of geographical super-cells each associated with a super-base station. Each super-base station transmits a data signal carrying the pilot data channel of the, or each, operator. In addition, each mobile station receives and processes said data signal as to extract therefrom the pilot data channel of the operator with which it is a subscriber.

(3) U.S. Pat. No. 6,738,981 Tonnby, et al. May 18, 2004 discloses a general access system for access to communication services, such as telecommunication, data communication and distribution of TV and radio. The access system comprises a connectivity network, a number of access adapters connected to the communication network, a number of service providing networks, each connected to access adapters, a number of network terminals connected to the connectivity network and to a number of terminals. Service access points of the service providing networks are distributed to all the network terminals which belong to subscribers of that particular service. Applications in the network terminals enhance and/or combine the services from different service providing networks and offer them to users via the terminals.

(4) United States Patent Application Publication 2004/0047311 to Pekonen, published Mar. 11, 2004 discloses a wireless system broadcasting a plurality of data packets to at least one wireless terminal. The wireless system comprises a plurality of base stations that interfaces to a backbone network in order to receive the plurality of data packets from a service source. Data packets are sent to a wireless terminal by a first base station transmitting a first channel burst and by a second base station transmitting a second channel burst, in which corresponding time offsets of the channel bursts, as characterized by amounts phase shifts, are different. Consequently, when the wireless terminal executes a handover from the first base station to the second base station, a probability that some of the data packets are lost, as result of practical network considerations, is reduced.

(5) United States Patent Application Publication 2003/0162543 to Auranen et al issued Aug. 28, 2003 discloses providing interrupt-free hand-over in a mobile terminal. First and second service signals broadcast by corresponding wireless transmitters are received and signal data is derived from the service signals. If the signal data from the first wireless transmitter meets a first predefined criterion and if the signal data from the second wireless transmitter meets a second predefined criterion, reception is switched from the first wireless transmitter to the second wireless transmitter after a predefined portion of the service signal has been received.

None of the prior art teach or disclose a method or system or apparatus for guaranteed and loss free handover via real-time or static signaling for a handheld digital broadcast receiver roaming in a digital broadcast network.

SUMMARY OF INVENTION

In one embodiment, a time slicing digital broadcast system includes a dynamic handover process switching a handheld terminal receiving services in a first signal to a second signal providing the same services, while roaming among cells in the digital broadcast system. The terminal takes into account the varying intervals between bursts in the current cell and the target cell. The terminal identifies possible handover signals from a received data stream, such as e.g. from multi protocol encapsulation/forward error correction frame in a data stream of the DVB system. A table in such MPE/FEC frame transmitted on each transport stream contains the mapping of the real-time handover signaling to the handovers that are possible from the signals that are transporting the actual transport stream. The table further contains a calculated retune interval which specifies the guaranteed interval for the handover from the actual signal to the target signal.

In another embodiment, e.g. when the digital broadcast system is a DVB-H system, the MPE/FEC frame contains media access control MAC addressing bits in the MPE section for real-time parameters in time slicing. The bits may be converted into signaling scenarios for guaranteed handover time. The scenarios are stored in the Network Information Table which contains a table identifying a scenario according to the MAC bits available for time slicing. Each scenario has guaranteed time values for the bits available per neighbor cell. As the available bits per neighbor cell increases, the number of time values increases in the scenarios. Each neighbor cell is identified by a descriptor and a table constructed of the guaranteed time available for handover from the current cell to the neighbor cell. The table may be stored in the IP/MAC Notification Table (INT)

An aspect of the invention is constructing a handover signaling table (HST) containing the mapping of real-time handover signals to handovers that are possible from signals that are transporting an actual transport stream and specifying guaranteed handover intervals for target transport streams.

Another aspect is assigning a data broadcast id and storing an HST in the Program Specific Information (PSI) and Service Information (SI) tables in the system.

Another aspect is identifying handover signals from the PSI/SI tables for a terminal receiving a current signal.

Another aspect is conducting signal measurements for handover signaling until loss free handover is possible for a target signal.

Another aspect is configuring MAC bytes in a MPE section of a MPE/FEC frame in a DVB system for handover scenarios between a current cell and a neighbor cell.

Another aspect is storing in a Network Information Table (NIT) in the DVB system a table of scenarios for guaranteed handovers based upon available MAC bytes.

Another aspect is accessing the table in the NIT based upon available MAC bytes for a guaranteed time value for a loss free handover from the current cell to the neighbor cell.

Another aspect is generating a cell-neighbor descriptor for each target cell having overlapping reception relationship with the current cell.

Another aspect is storing the cell-neighbor descriptor in the IP/MAC Notification Table (INT).

Another aspect is generating a neighbor-cell-location descriptor providing the cell_id of the neighbor cell which carries an elementary stream.

Another aspect is storing in a static signaling table the number of bytes reserved for real-time signaling.

Although some of the aspects are described using terminology of DVB or DVB-H systems, they may have counterparts in other digital broadcast systems, especially in systems for mobile use.

DESCRIPTION OF DRAWINGS

The invention will be further understood from the following detailed description of a preferred embodiment, taken in conjunction with appended drawings, in which:

FIG. 11 is a Handover Signaling Table (HST) for static signaling in FIG. 6;

FIG. 12 is a syntax table for Multi-Protocol Encapsulation (MPE) for real-time signaling;

DESCRIPTION OF PREFERRED EMBODIMENT

Before describing the improved signaling mechanism for a DVB-H terminal in a DVB system, it is believed appropriate to provide some brief description of a DVB system and a DVB-H receiver operable in the system. The DVB-H terminal and receiver in the DVB system are used as examples and embodiments of the invention.

Figure 1:
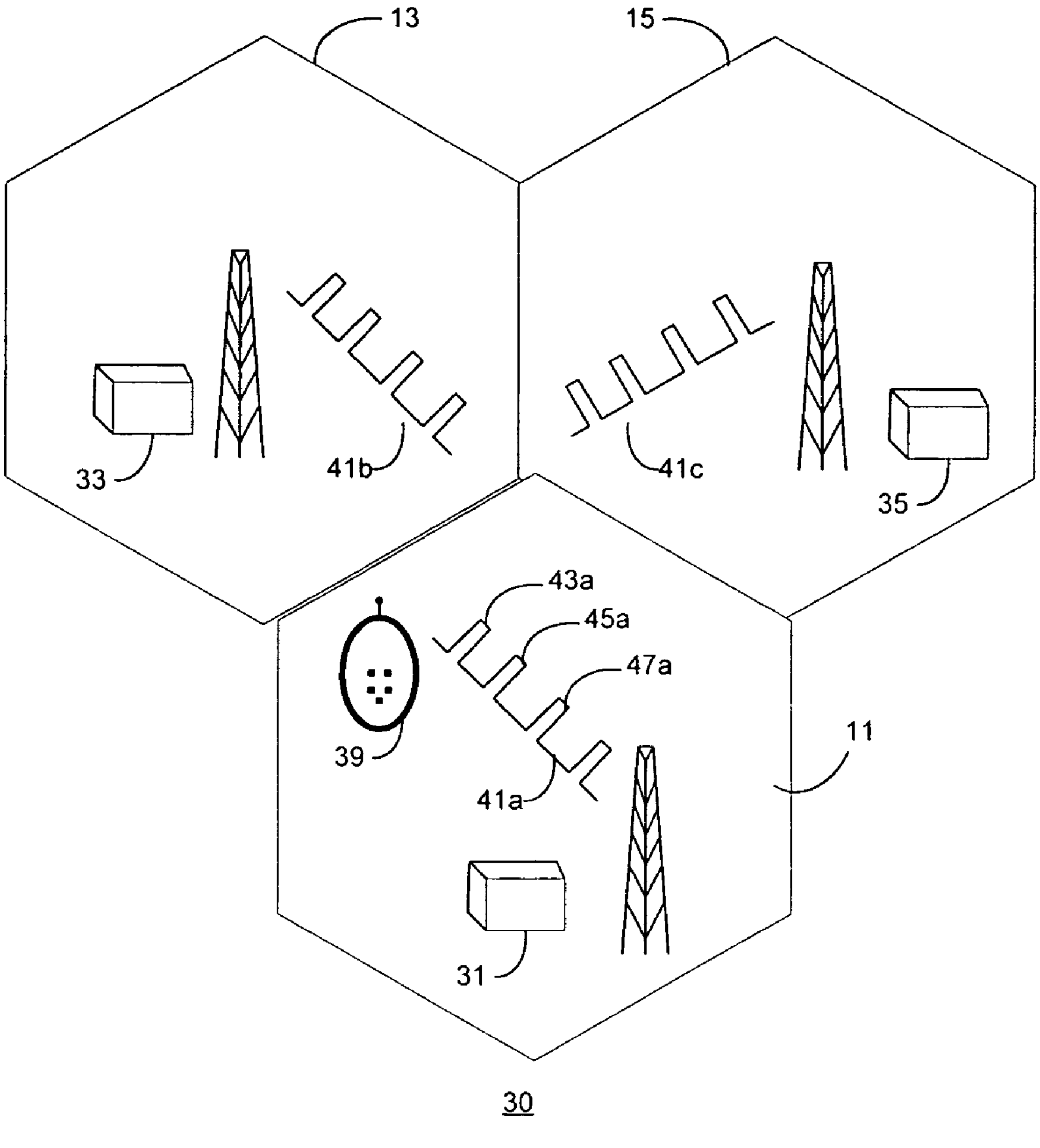
PRIOR ART FIG. 1
FIG. 1 is a prior art representation of a digital video broadcasting (DVB) system conforming to EN 303 192 in which the invention is implemented.

FIG. 1 is a simplified diagram of a time-slicing digital broadcasting system 30 operating according to ETSI EN 301 192, and ETS 300 744, supra, and incorporating the features of the present invention. The broadcasting system 30 is shown operating in a transmission region that includes the wireless cells 11, 13, and 15. A first transmitter 31 is located in the wireless cell 11, a second transmitter 33 is located in the wireless cell 13, and a third transmitter 35 is located in the wireless cell 15. The transmitters 31-35 broadcast corresponding service signals 41*a*-41*c* all of which are received by a mobile terminal 39. The service signals 41*a*-41*c* comprise information or data produced by a common service provider (not shown) and converted into transmission signals by the respective transmitters 31-35. Each of the service signals 41*a*-41*c* is transmitted on a different frequency to enable the mobile terminal 39 to discriminate between the service signals 41*a*-41*c*. Alternatively, signal discrimination can be achieved by transmitting the service signals 41*a*-41*c* using different coding schemes or other radio frequency transmission formats.

The wave forms of the service signals 41*a*-41*c* comprises a series of transmission bursts, exemplified by a transmission burst 43*a*, a transmission burst 45*a*, and a transmission burst 47*a* for service signal 41*a*. Similar bursts (not shown) occur for service signals 41*b*, and 41*c*. The service signals 41*a*-41*c* are preferably synchronized such that the transmission bursts 43*a*, 43*b*, and 43*c* for the respective transmitters 31-33 are broadcast at the same time. Each of the transmission bursts is a 4-Mbit/sec. pulse approximately one second in duration to provide a transfer of four Mbits of buffered information per transmission burst.

Figure 1A:
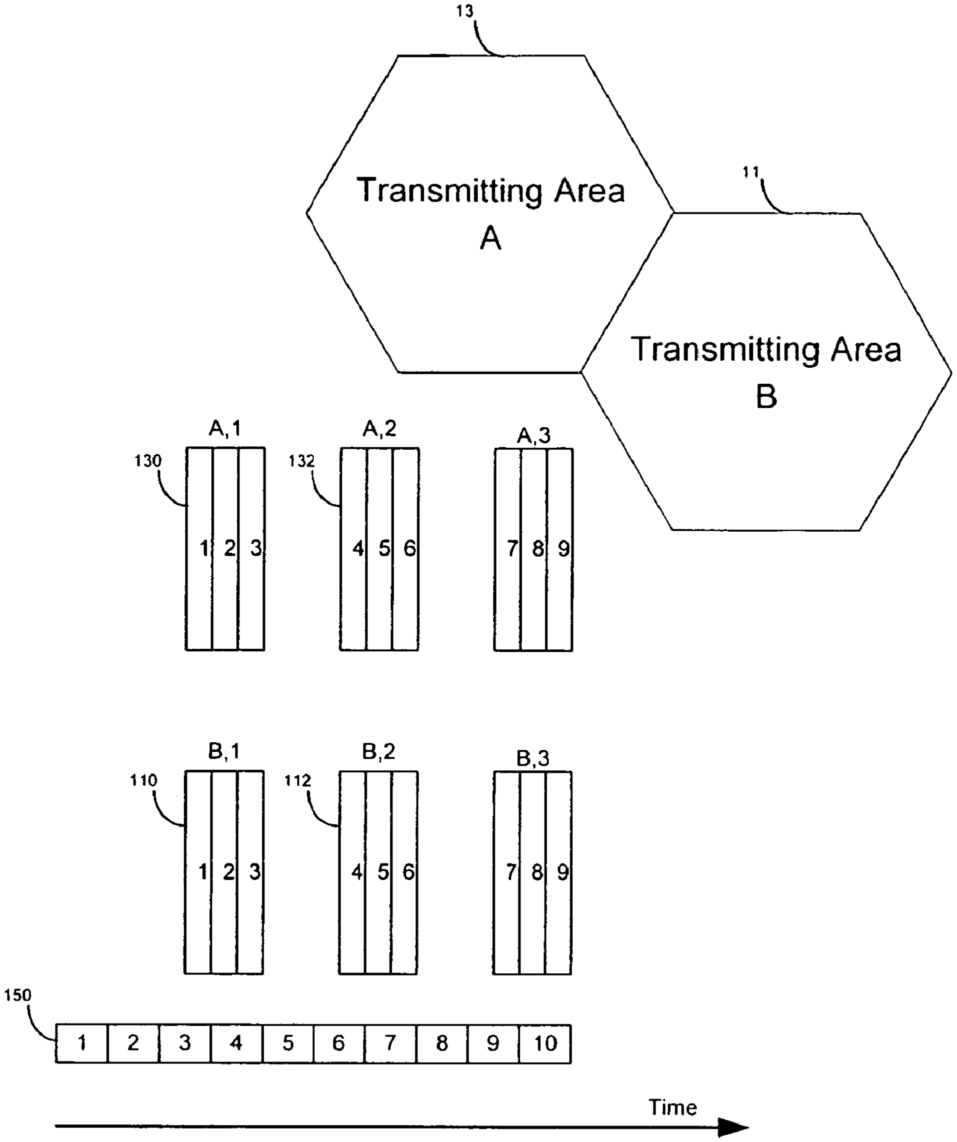
PRIOR ART FIG. 1A
FIG. 1A is a prior art representation of a time-slicing transmission system implemented in FIG. 1.

FIG. 1A shows the wireless system 30 utilizing time slice transmission for DVB transmission. The time-slicing system is based on Time Division Multiplexing (TDM) sending data in bursts using significantly higher bit rates compared to the bit rate required if the data was transmitted using a static bit rate. Channel bursts from cell 13 are synchronized with channel bursts from cell 11 (e.g. channel burst 130 occurs at essentially the same time as channel burst 110 and channel burst 132 occurs at essentially the same time as channel burst 112). The corresponding base stations that serve cells 13 and 11 are provided packet stream 150 through backbone network (not shown) such that packet delivery is synchronous. The amount of phase delay that is associated with the transmission of channel bursts from each base station is zero since channel bursts from all base stations occur at the same time. In this scenario, as shown in FIG. 1, wireless terminal 39 will receive all packets if wireless terminal 39 is handed over from cell 13 to 11. For example, if wireless terminal 39 receives channel burst 130 and channel burst 112 (as result of a handover from cell 13 to cell 11), wireless terminal 31 receives packet numbers 1, 2, 3, 4, 5, and 6.

Figure 2:
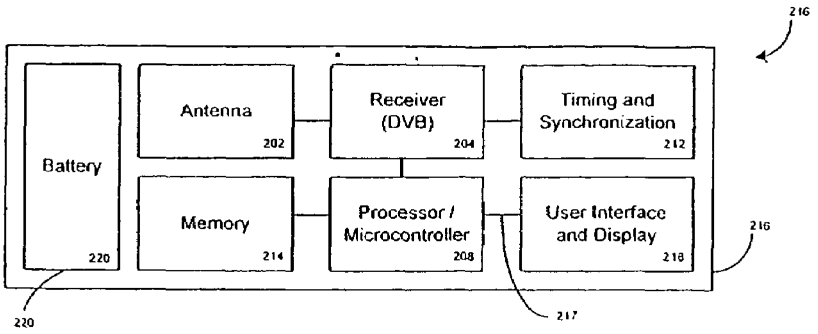
PRIOR ART FIG. 2
FIG. 2 is a prior art representation of a DVB-H receiver conforming to EN 300 744 and incorporated into the system of FIG. 1.

FIG. 2 discloses a handheld terminal 216 operable in a digital broadcasting system. The terminal includes an antenna 202 responsive to the digital broadcast signal. The antenna is coupled to a receiver 204 for demodulating and processing the received signal under the control of a processor/microcontroller 208 and a timing and synchronization module 212, as will be described in FIG. 2A. A memory 214 contains stored programs, executed by the processor/microcontroller in processing the received signal and providing an output 217 to a user interface and display 218, as will be described in FIGS. 2B. A battery 220 provides power for the handheld terminal.

Figure 2A:
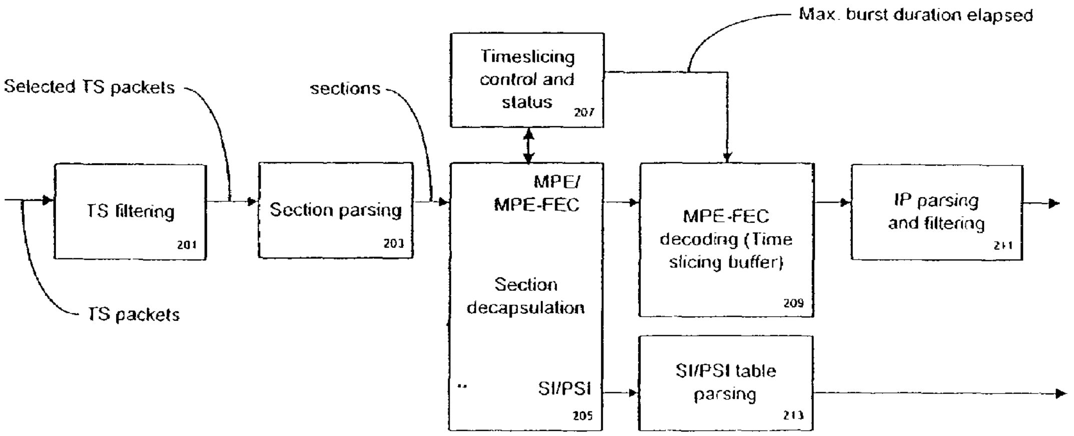
PRIOR ART FIG. 2A
FIG. 2A is a prior art representation of the receiver of FIG. 2 processing transport stream packets.

FIG. 2A, shows a partial block diagram of the receiver 204 for receiving digital broadcast signals. An input for the receiver part shown in FIG. 2A is a TS (Transport Stream) packet stream from the RF section of the receiver. The output of the receiver consists of IP streams, which are forwarded for storing and/or processing and rendering.

A TS filtering block 201 receives the whole TS stream and, according to the Packet Identifier (PID) value, passes through only the TS packets belonging to a desired elementary streams. There is an option to choose whether the erroneous packets are discarded or passed forward.

A section parsing block 203 decapsulates the payload of the TS packets and forms sections from these payloads. (It also takes into account the possible adaptation field and Payload Unit Start Indicator (PUSI)).

A section decapulation block 205 extracts the real time parameters and the payload of the section. According to the table id, it sends the payload along with some real time parameters into the MPE/MPE FEC or SI/PSI output. Besides that, all the real time parameters are sent to a time slicing control and status block 207.

The time slicing control and status block mainly analyses the real time parameters and generates different status data as a result. It also: signals a MPE-FEC decoding block 209 when the maximum burst duration is elapsed. This signaling is needed to start the decoding if the end of the burst is lost.

The MPE-FEC decoding block 209 writes the section payloads into a MPE-FEC frame according to the address information (real time parameter) and decodes the whole frame row by row. There are erasure and non-erasure decoders implemented. The erasure information can be obtained from the section Cyclic Redundancy Code (CR) C-32 or, if the erroneous TS packet: are passed forward, from a transport error indicator located in the header of the TS packet. If the MPE-FEC is not used, then this block only works as a time slicing buffer by storing one burst at a time.

An IP parsing and filtering block 211 receives the whole MPE-FEC frame. It goes through the corrected data areas in the frame to detect IP datagrams that were originally erroneous but were corrected by the decoder. Then it passes through only the IP datagrams with the desired IP address.

Although FIG. 2A shows the SI/PSI data is not provided with MPE-FEC encoding, it may be delivered by a SI/PSI table parsing module 213 in a similar way than the IP datagrams carrying application data.

Figure 2B:
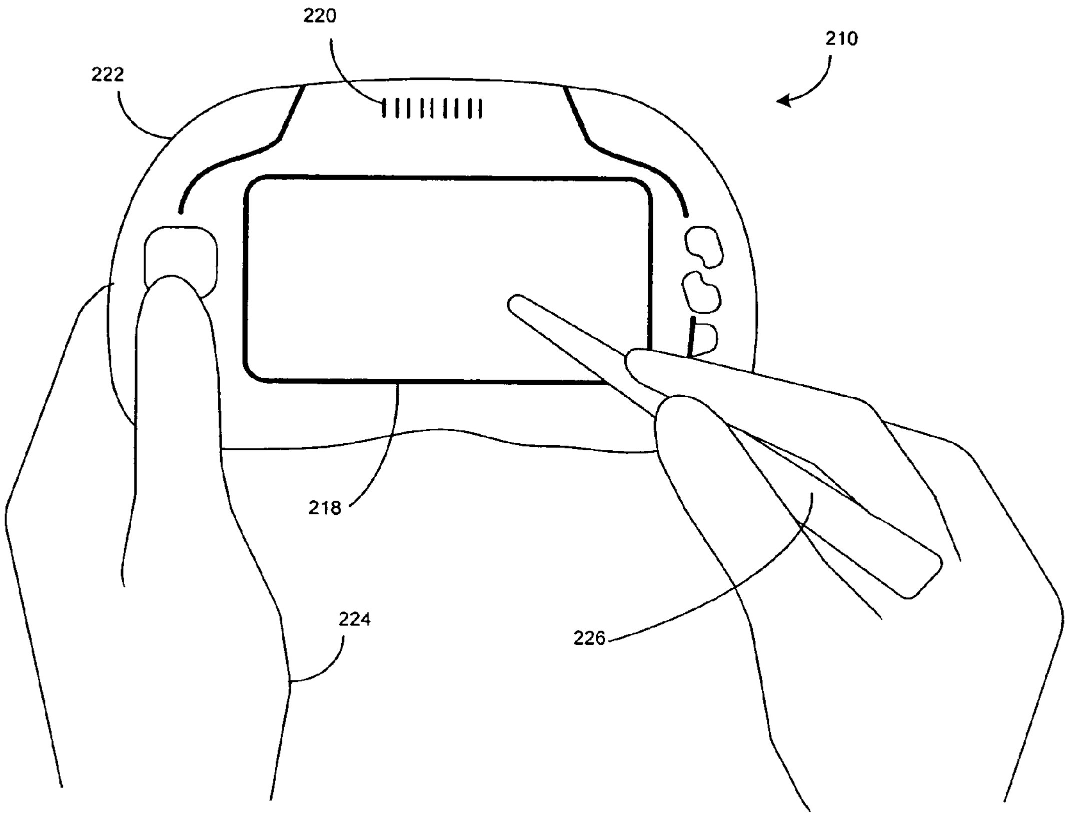
PRIOR ART FIG. 2B
FIG. 2B shows an embodiment of a DVB-H handheld terminal, model 7700 available from Nokia Corporation, Helsinki, Finland, assignee of the present invention.

An exemplary DVB-H Terminal 210, for example a Nokia 7700 model, as shown in FIG. 2B includes a screen 218 and a speaker 220, all within a handheld housing 222. An operator 224 uses a stylus 226 to call up and display programs in the screen for selection of digital video transmissions while roaming in different DVB cells.

Figure 3:
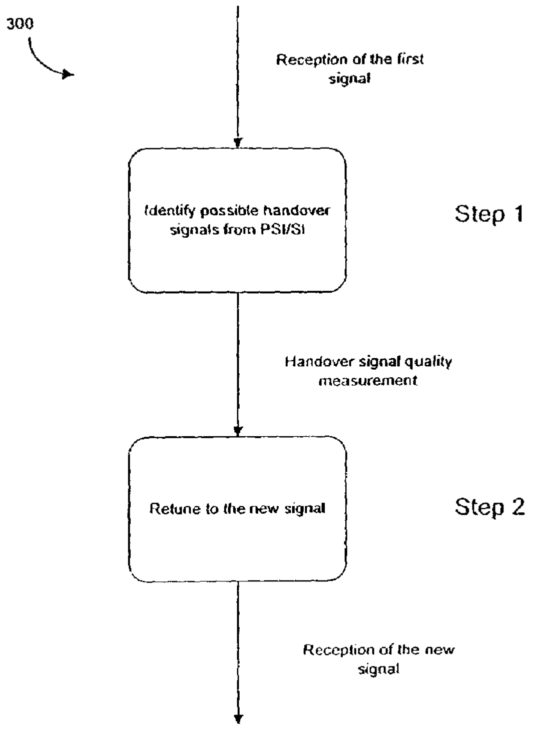
FIG. 3 is a representation of a handover process in a DVB-H receiver.

In a digital broadcast system, handover on the transport stream level is the procedure when a handheld digital broadcast terminal changes one or more of the following: frequency, cell, transport stream, network and continues receiving the same service with the new network settings. Loss free handover or seamless handover is characterized by no interruption of the service while executing the handover. In FIG. 3, a process 300 describes a handheld terminal receiving a first signal and transferring to a new signal as follows:

Step 1: the receiver identifies possible handover signals e.g. from the Program Specific Information (PSI) and Service Information (SI) available that describe the data streams in the digital broadcast system. Handover signal quality measurements are conducted by the terminal based on the PSI/SI information.

Figure 4:
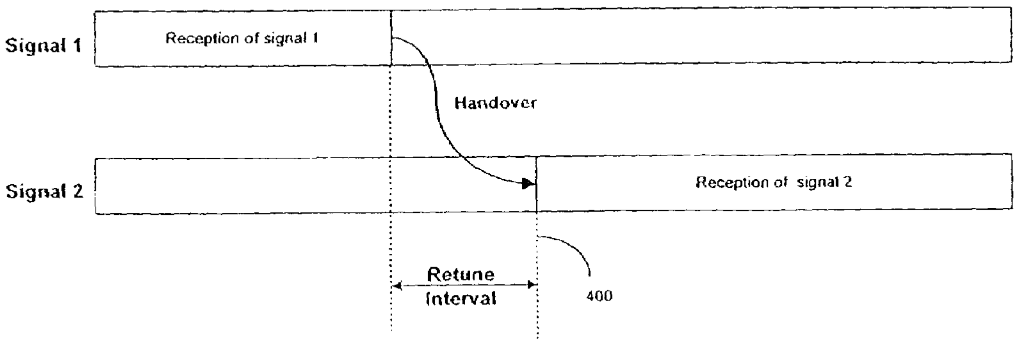
FIG. 4 is a representation of a retune interval in the handover process of FIG. 3.

Step 2: the terminal retunes to the new signal, as will be described in conjunction with FIG. 4.

The main bottleneck for the lossfree handover is the monolithic design of the DVB-H(T) receivers, typically they can tune to only one frequency and/or transport stream. One important factor that influences the handover procedure of a digital broadcast receiver, e.g. such as a DVB-H receiver, is a retune interval. In FIG. 4, a retune interval 400 is the minimum time required by the terminal to switch from signal 1 to signal 2 and continue receiving the signal. The retune interval is receiver implementation dependent (time reconfigure and restart the circuitry, time needed to empty the buffers) but also network dependent (need to receive some signaling such as Program Association Table (PAT), and Program Map Table (PMT)). However, the receiver has all the information needed to determine the needed retune interval.

An implication of this is that it must be ensured that the receiver looses no data during the handover procedure—retune interval.

One of the main aspects that are considered in the scope of signaling for handover on the signaling level is the service identification.

On DVB-H signaling, the service is identified by a set of IP addresses on certain platforms. For this reason a service can be globally identified by a global scope platform_id and a set of IP addresses or a network_id, a network scope platform_id and the set of IP addresses.

The network_id and the global scope platform_id are defined and allocated as in EN 301 192 [TR 101 162]. The platform_id range is divided into two parts:

first range: 0x1-0xFFEFFF is reserved for registration by DVB organization. These platform_id values are globally unique.

Second range: 0xFFF000-0xFFFFFE is managed by DVB network operator. These platform_id values are unique within the scope of the DVB network=>globally unique the (network_id, platform_id) combination.

As a result of the service, the identification inter platform handover cannot be handled on the DVB-H level. Depending on the handover type, the service identification can be narrowed down in the following manner.

| Handover type | Identification |
|---|---|
| Within the transport stream | Packet Identifier (PID) |
| Within the network | platform_id, set of IP addresses |
| network | Global scope platform_id, set of IP addresses |

IP based services are announced in the IP/MAC Notification Table (INT) of the appropriate platform (there is one INT table per platform in the PSI/SI signaling) along with their availability in the different signals (i.e. networks and transport streams).

Once the receiver starts the handover process by discovering the available signals to handover, the receiver can determine if the same service is available or not on those signals. Based on this information and the signal quality information, the receiver decides to execute or not the handover process.

Figure 5:
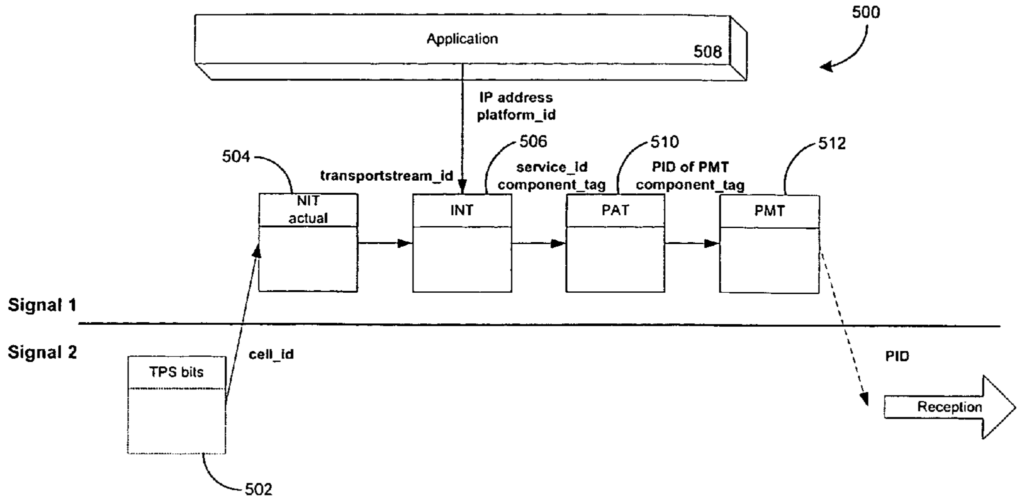
FIG. 5 is a representation of an intra Time Slice (TS) handover process in a DVB system.

FIG. 5 describes an Intra Time Slice (TS) handover process 500, as follows:

Step 1: Signal 2 502 provides Transmission Parameter Signaling (TPS) bits along with cell_id to a Network Information Table (NIT-actual) 504 of signal 1.

Step 2: The transportstream id is provided by NIT 504 to an IP/MAC Notification Table (INT) 506 serviced by an application 508 at an IP address platform_id.

Step 3: The INT provides the service_id and component_tag to a Program Association Table (PAT) 510 in signal 1.

Step 4: The PAT provides the packet identifier (PID) of the PMT and component_tag to the Program Mapping Table (PMT) 512 and the PID is provided to signal 2 for reception of signal 1 services in signal 2.

Figure 6:
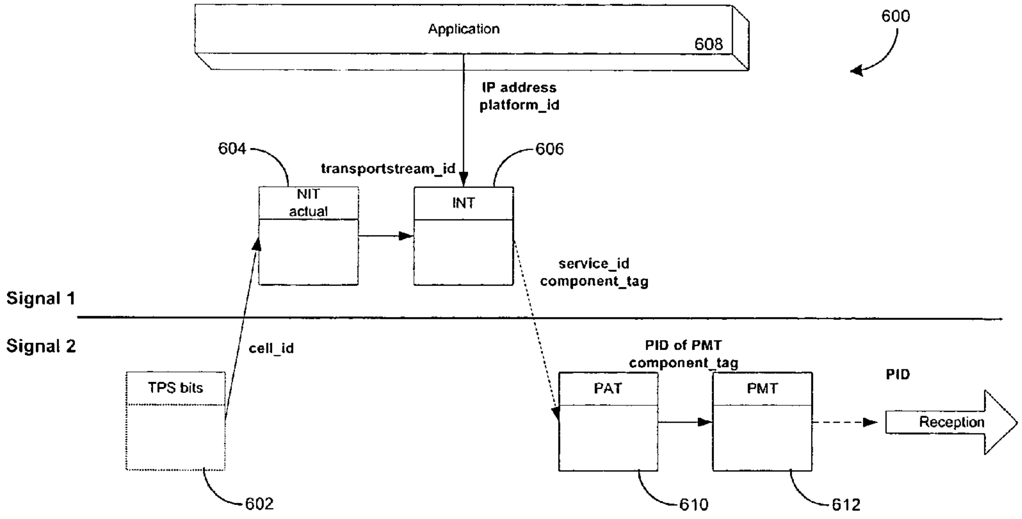
FIG. 6 is a representation of an intra network, inter transport stream handover process for signals 1 and 2 in a DVB system.

FIG. 6 describes an intra network, intertransport stream handover process 600, as follows:

Step 1:

Steps 1-3 (502, 504, 506) in process 500 are repeated in the process 600 (602, 604, 606).

Step 4: signal 1 transmits service_id and component_tag to PAT 610 and PMT 612 in signal 2 for PID and reception in signal 2.

Figure 7:
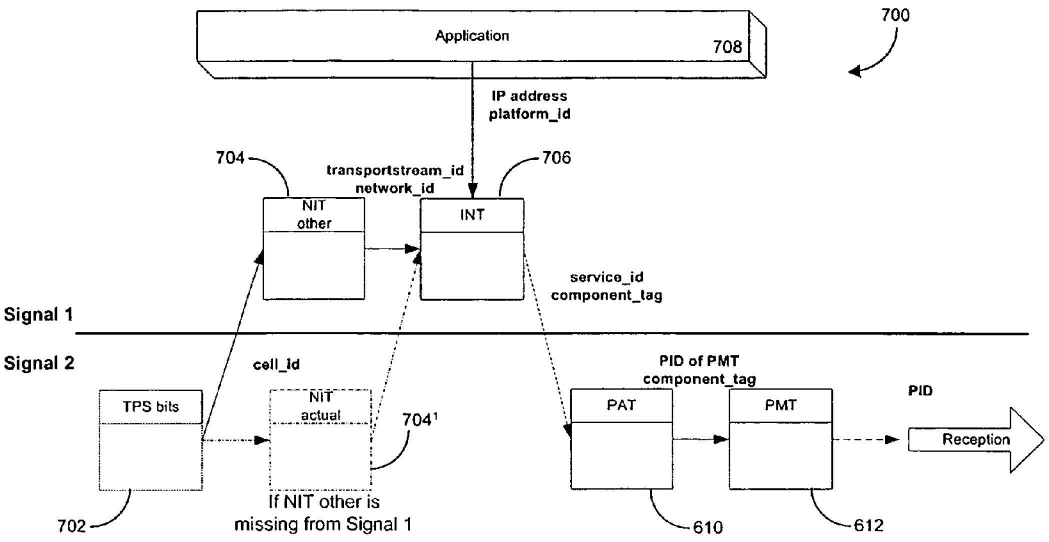
FIG. 7 is a representation of an inter network handover process of FIG. 6 if an NIT other is missing from signal 1.

FIG. 7 describes an inter network process 700, as follows:

Step 1: signal 2 702 transmits TPS bits to a NIT other 704 in signal 1 and to NIT actual 704$^1$ in signal 2 if NIT other is missing in signal 1.

Step 2: NIT other 704 transmits a transport stream_id and network_id to INT 706 serviced by an application 708.

Step 3: INT 706 transmits a service_id and component_tag to signal 2 which repeats step 4 in process 600.

Now turning to the invention, a signaling mechanism is proposed that enables loss free handover from one signal to the other.

In DVB-H, data is sent in Multi-Protocol Encapsulation—Forward Error Correction (MPE-FEC) frames described in EN 301 192, supra at pages 44-48. The aim of the solution is to signal the terminal, how much time can be spent to hand over from one signal to the other. The handover is typically executed after receiving the last byte of the MPE-FEC frame. This mechanism allows also to signal the terminal that handover from certain MPE-FEC frame is not possible without data loss.

Figure 8:
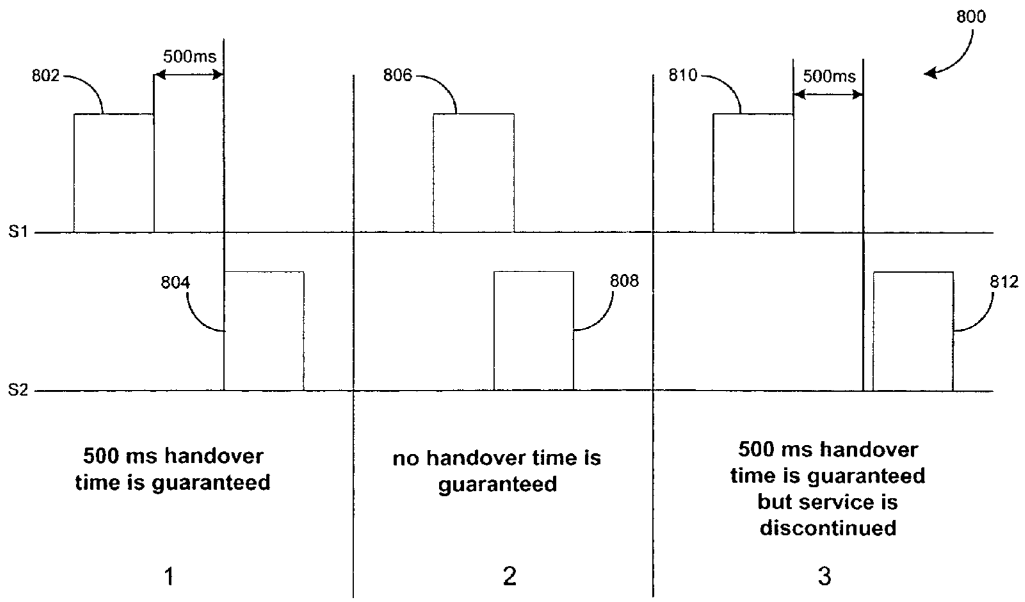
FIG. 8 is a representation of a signaling mechanism that enables loss free handover from one signal to the other in FIG. 6.

The possible scenarios are exemplified in signal bursts 800 for S1 and S2, shown in FIG. 8, as follows:

In scenario 1, signal bursts 802 and 804 are within the guaranteed handover time, which in this example is 500 ms and handover service is guaranteed.

In scenario 2, signal bursts 806 and 808 overlap and no handover time is guaranteed.

In scenario 3, signal bursts 810 and 812 are more than 500 ms apart and while 500 ms handover time is guaranteed, the bursts are too far apart to effect transfer.

To ensure loss-freeness of the handover also the content carried by the two signals has to be synchronous.

Figure 9:
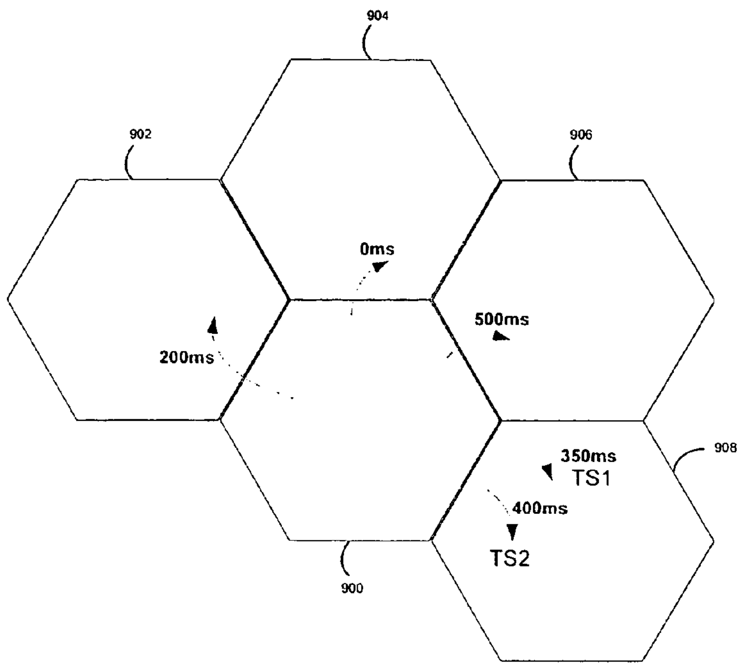
FIG. 9 is a representation of re-tune intervals for contiguous cells in a representative DVB system.

In a network from a given location there can be more than one signal available for handover. As shown in FIG. 9, a cell 900 provides contiguous cells 902, 904, 906 and 908 with different handover times. In the case of cell 908, time slice signals TS1 and TS2 have different handover times. In such cases, the handover signaling must be able to signal the corresponding handover times.

Figure 10:
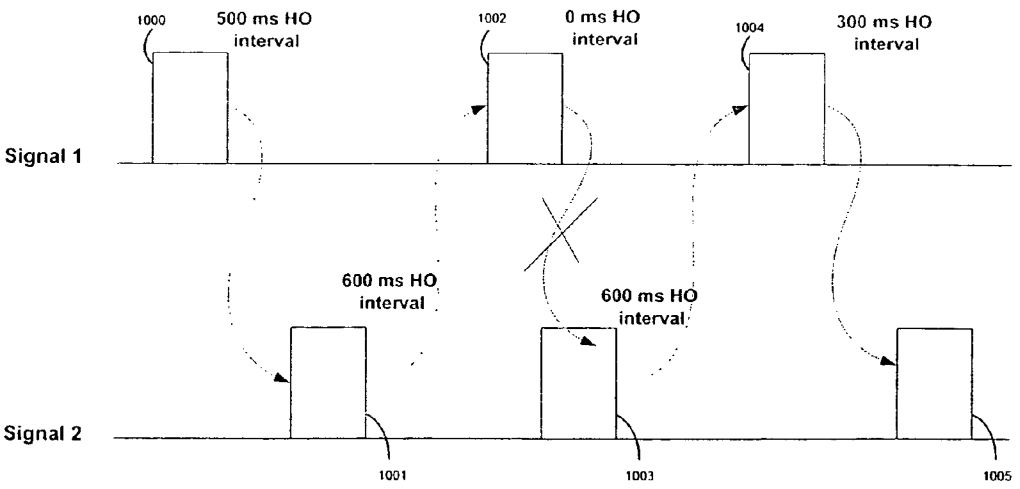
FIG. 10 is a representation of exploiting time slice intervals for signals 1 and 2 in FIG. 6 to obtain the necessary retune interval for a handover process.

In the case of time sliced DVB-H services for signal 1 and signal 2, shown in FIG. 10, the burst nature of bursts 1000, 1002, 1004 for signal 1 and bursts 1001, 1003, 1005 for signal 2 can be exploited in order to provide the necessary retune interval when handing over from one signal to another. The relative position of the time slices (MPE-FEC frames) to each other is not fixed, it can freely vary from one moment to the other, and hence the adopted signaling must have the same dynamism as the MPE-FEC frames occurrence The handover time for burst 1000 is within the HO interval for 1001. The HO interval for burst 1001 is within the HO interval for burst 1002. However, the HO interval for burst 1002 is not within the HO interval for burst 1003. The burst 1004 has an HO interval within the HO interval for burst 1003, and within burst 1005.

A proposed signaling mechanism overcoming the limitations of the prior art is comprised of two parts:

(a) real-time signaling, carried within an MPE-FEC frame along with the useful data. The real-time signaling is dynamic, can be different from one MPE-FEC frame to another, and carries the handover time information from the respective MPE-FEC frame of the actual signal to the other signal.

(b) static signaling, carried in the Program Specific Information (PSI) tables of the DVB signaling. The static signaling is mapping the real-time signaling to the available signals to hand over.

A. Static Signaling

A Handover Signaling Table (HST), shown in FIG. 11 is proposed in accordance with ETSI EN 301 192. It can be announced similarly as IP/MAC Notification Table (INT) is announced. Its Packet Identifier (PID) is announced in the Program Map Table (PMT)along with a data_broadcast_id_descriptor. In this case a data_broacast_id should be assigned for the new table (HST). This table is transmitted once on each transport stream and contains the mapping of the real-time handover signaling to the handovers that are possible from the signals that are transporting the actual transport stream specifying also the guaranteed handover intervals. The repetition rate of such a table can be very low, the proposed repetition interval being 1 minute. The definition of table elements in FIG. 11 related to static signaling is as follows:

real_time_bits_allocation 1100: Specifies the number of bits allocated in the real_time_parameter structure for carrying the handover_id. Value of "0" indicates that no handover is supported from the actual transport stream.

signal_identifier_loop_length 1102: Specifies the number of bytes in the loop immediately following the signal_identifier_loop_length filed.

original_network_id1104: Identifies the network_id of the originating delivery system.

cell_id 1106: Identifies a cell in which the target signal is transmitted. Must be unique within original_network_id.

transport_stream_id 1108: Identifies the multiplex that is carried by the target signal.

signal_id 1110: Identifies the signal in the Handover Signaling Table scope and must be unique within it. (Signal is globally identified by the original_network_id, cell_id, and transport_stream_id triplet.)

ts_signal_loop_length 1112: Specifies the number of bytes in the loop immediately following the ts_signal_loop_length filed.

home_signal_id 1114: Identifies the signal from where the hand over occurs.

handover_identifier_loop_length 1116: Specifies the number of bytes in the loop immediately following the handover_identifier_loop_length filed.

handover_id 1118: Identifies the handovers. It is mapping the identification carried in the real-time parameters structure to the possible handovers. Handover_id must be unique within the handover_identifier_loop.

handover_info_loop_length 1120: Specifies the number of bytes in the loop immediately following the handover_info_loop_length filed.

retune_interval 1122: Specifies the guaranteed retune interval for the certain MPE-FEC frame of the actual signal to the target signal. The retune interval is calculated with the following formula:

Retune Interval=(retune_interval+1)*100 ms target_signal_id 1124: Identifies the neighbor signal where the handover is possible. (neighbor signal)

The first loop of the table (signal identifier loop 1102) maps the signals that are carrying the actual transport stream and the signals that are not carrying the current transport stream but they are possible choices for handover, to an 8-bit identifier (signal_id).

The second loop 1116 lists the signals that are carrying the actual Transport Stream (TS) identifies the possible handover signals from it with the appropriate handover interval, than a handover_id is assigned to it.

The size of such table for TS that is carried on 20 cells and having 20 neighbor signals (no overlapping between the two figures) when each home cell has 5 neighbor cells and 8 bits are used for handover_id can be large as (worst case): 48 byte. This amount of data imposes very high memory requirements for the receiver. The amount of data can be significantly reduced when only the handover_ids of the actual signal is announced (~20 fold less–>2.5 kByte).

B. Real-time Signaling

The real-time signaling comprises the handover_id carried in the real-time parameter structure of the MPE and MPE-FEC frames. The amount of bits reserved for this purpose is indicated in the static signaling.

The real-time parameters for time slicing are contained in the MAC bytes of the MPE section header 1200, shown in FIG. 12. The semantics of the ultiprotocol_encapsulation_info structure are as follows:

MAC_address_range 1202: This 3-bit field shall indicate the number of MAC bytes that the service uses to differentiate the receivers according to table 7 of ETSI EN 301 192.

MAC_IP-mapping_flag 1204: This is a 1-bit flag. The service shall set this flag to "1" if it uses the IP to MAC mapping as described in RFC 1112 [7] for IPv4 multicast addresses and RFC 2464 [20] for IPv6 multicast addresses. If this flag is set to "0", the mapping of IP addresses to MAC addresses is done outside the scope of the present document.

Alignment_indicator1206: This is a 1-bit field that shall indicate the alignment that exists between the bytes of the datagram_section and the Transport Stream bytes according to table 8 of ETSI EN 301 192.

Reserved 1208: This is a 3-bit field that shall be set to "111".

max_sections_perdatagram 1210: This is an 8-bit field that shall indicate the maximum number of sections that can be used to carry a single datagram unit.

Currently, 4 bytes are used, leaving 2 bytes free. Without changing some of the current norms, only 1 of the free bytes can be used, because the remaining byte is to be used for MAC addressing (MAC addressing can be useful for easy HW filtering, also for multicast). The described mechanisms can be implemented based on the "1 byte scenario" and the "2 byte scenario"; the 2 byte scenario leads to more optimized behavior. There might be some backwards compatibility issues with the "2 byte scenario".

The goal of the dynamic signaling is to tell, for each neighbor cell, how much time is available for handover. With only 1 or 2 byte available, this must be heavily optimized. Many different mechanisms are possible, and the invention describes multiple mechanisms that we think are best suitable. The standard may define one or even multiple of these mechanisms.

Whether the 1 byte scenario or the 2 byte scenario is used could be up to the operator. Certainly, in a particular network, either the 1 byte or the 2 byte scenario is used. Therefore, it shall be signaled in the Network Information Table (NIT), as shown in Table 2, which scenario is used (e.g. in the structure [is it the linkage descriptor?] which contains the time slice indicator bit):

TABLE 2

| |
|---|
| 00: no handover signaling |
| 01: handover signaling based on the 1 byte scenario |
| 10: handover signaling based on the 2 byte scenario |
| 11: reserved |

Depending on now many neighbor cells the current cell has, and depending on whether the 1 byte scenario or the 2 byte scenario is used, there are more or less bits available for signaling the handover time per cell. It is certainly not possible to signal a time value. But it will be possible to signal a "guaranteed handover time", in pre-defined steps.

One possibility is to pre-define the steps in the standard. The time values are just examples:

if 1 bit is available per neighbor cell:

TABLE 3a

| | |
|---|---|
| 0 | less than 1000 ms is available for handover, or no handover is possible |
| 1 | 1000 ms or more is available for handover |

if 2 bits are available per neighbor cell:

TABLE 3b

| | |
|---|---|
| 00 | less than 500 ms is available for handover, or no handover is possible |
| 01 | 500 ms or more is available for handover |
| 10 | 1000 ms or more is available for handover |
| 11 | 1500 ms or more is available for handover |

if 3 bits are available per neighbor cell:

TABLE 3c

| | |
|---|---|
| 000 | less than 250 ms is available for handover, or no handover is possible |
| 001 | 250 ms or more is available for handover |
| 010 | 500 ms or more is available for handover |
| 011 | 750 ms or more is available for handover |
| 100 | 1000 ms or more is available for handover |
| 101 | 1250 ms or more is available for handover |
| 110 | 1500 ms or more is available for handover |
| 111 | 1750 ms or more is available for handover |

if 4 bits are available per neighbor cell:

TABLE 3d

| | |
|---|---|
| 0000 | less than 125 ms is available for handover, or no handover is possible |
| 0001 | 125 ms or more is available for handover |
| 0010 | 250 ms or more is available for handover |
| 0011 | 375 ms or more is available for handover |
| 0100 | 500 ms or more is available for handover |
| 0101 | 625 ms or more is available for handover |
| 0110 | 750 ms or more is available for handover |
| 0111 | 875 ms or more is available for handover |
| 1000 | 1000 ms or more is available for handover |
| 1001 | 1125 ms or more is available for handover |
| 1010 | 1250 ms or more is available for handover |
| 1011 | 1375 ms or more is available for handover |
| 1100 | 1500 ms or more is available for handover |
| 1101 | 1625 ms or more is available for handover |
| 1110 | 1750 ms or more is available for handover |
| 1111 | 1875 ms or more is available for handover |

. . . and so forth for 5 bits, 6 bits, . . . 16 bits

In order to have more flexibility, and especially in order to be more future-proof, instead of pre-defining the steps, the steps should be signaled. The logical place for such signaling is in the NIT, in a new descriptor that contains exactly these tables. In practice, it will probably be enough to define tables for 1 bit, 2 bits, 3 bits and possibly 4 bits. More resolution (than 125 ms) or more range (than 1875 ms) will not be needed. The invention, however, covers all possibilities up to 16 bits.

The number of neighbor cells for the current cell will be fairly constant. However, the elementary streams come and go. If looking at the current elementary stream, the number of neighbor elementary will never be higher than the number of neighbor cells.

In order not to waste space in the real-time parameters, the neighbor cells of the current cell must be numbered, e.g. from 0 to n, where n is the number of neighbor cells. This numbering is static, and completely arbitrary. A neighbor cell in this context is a cell which has overlapping reception area with the current cell. Whether or not the neighbor cell carries one or more "identical elementary streams" (elementary streams that carry the same IP flows) as the current cell is not relevant at the moment.

A new descriptor called "cell-neighbor-descriptor" needs to be defined for this numbering. This descriptor could replace the cell-list-descriptor that is currently used, and has then the following structure:

TABLE 4a

```
cell-neighbor-descriptor ::= { cell { subcell } { neighbor-cell } } .
cell ::= cell_id (cell of the current network)
subcell ::= subcell_id (subcell of the previously defined cell)
neighbor-cell::= network_id cell_id (neighbor cell of the previously
defined cell, can be in another network)
```

In case the cell-neighbor-descriptor doesn't replace the cell-list-descriptor, it can be defined as a separate descriptor with the following structure:

TABLE 4b

```
cell-neighbor-descriptor ::= { cell { neighbor-cell } } .
cell ::= cell_id (cell of the current network)
neighbor-cell::= network_id cell_id (neighbor cell of the previously
defined cell, can be in another network)
```

where:

the cell loop (outer loop) is repeated for all cells of the current network the subcell loop (first inner loop) is repeated for all subcells of the previously defined cell the neighbor-cell loop (second inner loop) is repeated for all neighbor cells of the previously defined cell no neighbor relation is defined for subcells (because they have the same burst timing as the current cell, so handover from a subcell to a neighbor cell doesn't is no different than handover from the parent cell to a neighbor cell)

the order of appearance of the neighbor cells in the neighbor-cell loop defines the numbering of neighbor cells for the current cell, starting from 0 and increasing in steps of 1.

The neighbor cell loop can be slightly optimized, by listing all the neighbor cells which are contained in the current network first, and by signaling the network-id of a neighbor cell only if it differs from the current network-id and changes from the last previously signaled network-id in the loop. This leads to the following structure (only shown as a derivative of table 3b, but also applicable for table 3a):

TABLE 4c cell-neighbor-descriptor ::= { cell_id { neighbour_cell_id_own_nw } { network_id { neighbour_cell_id } } .

where:

the cell loop (outer loop) is repeated for all cells of the current network the first neighbor-cell loop ($1^{st}$ inner loop) is repeated for all neighbor cells which are in the current network the network-loop ($2^{nd}$ inner loop) is repeated for all other networks which contain neighbor cells of cells in the current network the second neighbor-cell loop (loop inside network loop) is repeated for all neighbor cells of the current cell which are in the network that was specified just before the loop It must be noted that the cell neighbourships need not be completely specified for all cells of the current network. If some neighbor relationships are not specified, it doesn't do any harm except that no guarantees can be given to the terminals how much time is available for handover.

A simple solution would now define that for 4 neighbor cells, in the 1 bit scenario, 2 bits of real time parameters shall be used per neighbor cell (as defined in table 3), whereas in the 2 bit scenario, 4 bits of real time parameters shall be used per neighbor cell (as defined in table 3d). This simple solution is part of the invention, but can be further optimized, as follows:

EXAMPLE 1

(Simple Method, 1 Byte Scenario, 4 Neighbor Cells) the Real Time Parameters "01110010" Express that the Time Available for Handover from the Current Cell to its Neighbor Cells is:

for neighbor cell 0 (the $1^{st}$ neighbor in the neighbor-cell loop): 500 ms or more for neighbor cell 1 (the $2^{nd}$ neighbor in the neighbor-cell loop): 1500 ms or more for neighbor cell 2 (the $3^{rd}$ neighbor in the neighbor-cell loop): less than 500 ms or no handover for neighbor cell 3 (the $4^{th}$ neighbor in the neighbor-cell loop): 1000 ms or more In example 1, 2 bits are used for each neighbor cell.

EXAMPLE 2

(Simple Method, 1 Byte Scenario, 6 Neighbor Cells) the Real Time Parameters "01110010" Express that the Time Available for Handover from the Current Cell to its Neighbor Cells is:

for neighbor cell 0 (the $1^{st}$ neighbor in the neighbor-cell loop): 500 ms or more for neighbor cell 1 (the $2^{nd}$ neighbor in the neighbor-cell loop): 1500 ms or more for neighbor cell 2 (the $3^{rd}$ neighbor in the neighbor-cell loop): less then 1000 ms or no handover for neighbor cell 3 (the $4^{th}$ neighbor in the neighbor-cell loop): less then 1000 ms or no handover for neighbor cell 4 (the $5^{th}$ neighbor in the neighbor-cell loop): 1000 ms or more for neighbor cell 5 (the $6^{th}$ neighbor in the neighbor-cell loop): less then 1000 ms or no handover In example 2, 2 bits are used for neighbor cells 0 and 1 each, and 1 bit is used for neighbor cells 2 and 5 each. This example shows a small optimization that doesn't waste any bits in case the number of bits available is not divisible by the number of neighbor cells: the first few cells use 1 bit more than the last few cells, so that all the available bits are used.

Not more than 8 neighbor cells can be signaled in the 1 byte scenario, and not more than 16 for the 2 byte scenario. But even if there are more neighbor cells than can be signaled, there is no harm, as the network just simply can't give any guarantee to the terminals regarding how much time there is for handover (the terminal may still be able to handover in a loss-free manner).

For the current elementary stream, not all neighbor cells of the current cell contain an actually neighbor elementary stream. This can happen if a certain service is not distributed in the whole network. At the edge of a "service area" (which contains all cells in which a certain service is distributed), no handover is possible to the neighbor cells that are outside the service area. In other words, the number of neighbor elementary streams can be very different for different elementary streams of the same cell. No precious real-time parameter bits shall be wasted for such a neighbor cell. This leads to a further optimization, which is now described.

For each elementary stream, it shall be signaled to which neighbor cells the elementary stream can be handed over. This signaling is static for the lifetime of the elementary stream, and therefore is best included in a table that contains signaling related to elementary streams. The INT table is the optimal place for this signaling.

A neighbor-cell-location-descriptor needs to be inserted into the operational descriptor loop, which defines on which neighbor cell(s) the currently described elementary stream is carried. The neighbor-cell-location-descriptor can be inserted after the location-descriptor, and applies to the elementary stream referenced by the preceding location-descriptor. If the neighbor-cell-location-descriptor is used in the INT, there is no need for a neighbor-cell-descriptor in the NIT!

The neighbor-cell-location-descriptor contains the cell-id of the neighbor cell(s) which carry the elementary stream.

TABLE 5

| |
|---|
| neighbor-cell-location-descriptor ::= { neighbour__cell__id } . |

Only by inserting the neighbor-cell-location-descriptor into the operational descriptor loop, it becomes meaningful.

In one embodiment, the listed neighbour_cell_ids define the "actual neighbors" of the elementary stream, numbered, e.g. in the order of appearance from 0 to n, in a same way as in the proposed cell-neighbor-descriptor the "possible neighbors" were numbered. The real-time parameters will now refer to the sequence number of the "actual neighbor" rather than to the sequence number of the "possible neighbor" as in the simple solution. Otherwise, the same principles and micro-optimizations apply as to the simple solution.

Figures 13, 14:
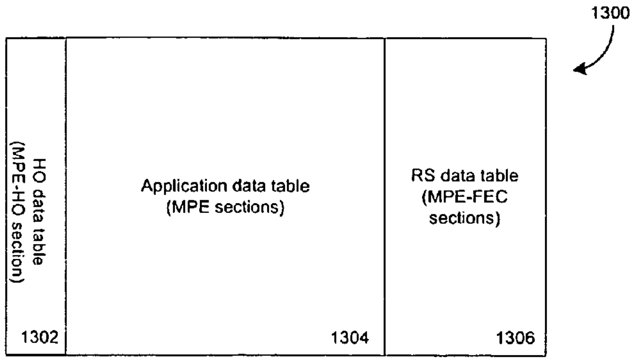
FIG. 13 is a representation of an MPE-FEC frame layout for real-time based signaling.
FIG. 14 is a syntax table of an MPE-HO for real-time signaling.

Handover signaling with a "MPE-HO section", as shown in FIG. 13, ameliorates the memory and bandwidth consumption met in the previous solutions by defining of a new section type based on the MPEG-2 private section definition. For background see the text "The MPEG Handbook" by J. Watkinson, published by Focal Press, Boston, Mass., 2001 (ISBN 0240-51656 7) at pages 20-22, and fully incorporated herein by reference. Such a section would be transported within the MPE-FEC frame as a new table, the Handover Data table that comprises of only one MPE-HO section. The presence of such a section in the MPE-FEC frame is optional, a service that does not carry this information is not supporting the handover.

The layout of the MPE-FEC frame 1300, as shown in FIG. 13, includes a HO data table 1302, an application data table 1304 and a RS data table 1306 as described in EN 303 192, supra, pages 46-48. The data table 1302 is layed out per the MPE-HO section 1400, shown in FIG. 14. The semantics for the MPE-HO section is similar to that of the MPE section, as follows:

original_network_id 1402: Identifies the network_id of the originating delivery system.

cell_id1404: Identifies a cell in which the target signal is transmitted. Must be unique within original_network_id.

transport_stream_id1406: Identifies the multiplex that is carried by the target signal.

retune_interval1408: Specifies the guaranteed retune interval for the certain MPE-FEC frame of the actual signal to the target signal. The retune interval is calculated with the following formula:

$$\text{Retune Interval}=(\text{retune\_interval}+1)*10\text{ ms}$$

The MPE-HO section shall carry real time parameters including delta_t, table_boundary, frame_boundary and address within the MAC_address_4 . . . MAC_address_1. In practice usually frame_boundary is not set and address has no meaning. The MPE-HO section is transmitted using the same PID as the MPE and MPE-FEC data.

The definition of the other fields can be found in the DVB-H (real-time parameters) and MPEG2 (ISO/IEC 13818-1) standards.

The MPE-HO section announces all the neighbor signals where the terminal is able to hand over (typically 5 or less) along with the guaranteed retune intervals.

One of the main benefits of such a signaling is that it eliminates the need of static signaling, reducing this way the memory consumption on the terminal side.

The required bandwidth for such a flow of is 4 kbps in case that there are 5 neighbor signals and 10 MPE-FEC frames transmitted in a second.

The priority of such a signaling is low, so there are no special protection provided against data loss.

One optimization of the solution can be achieved by identifying the original_network, cell_id and transport_stream_id triplet by an identifier that can be announced in a PSI/SI descriptor or table, similarly as in the signal_identifier_loop of the first solution proposal, described above in connection with the description of static signaling. In this case, signal_id would be transmitted in the MPE-HO section instead of the original_network, cell_id and transport_stream_id triplet. (No major bandwidth improvement is expected.)

Sub-cell handover is not in the scope of the signaling. It is considered that the transport stream transmitted in a subcell is identical with the transport stream transmitted in the parent cell and the delay observed between the signal of the sub-cell and the signal of the parent cell is not imposing a need for signaling the handover interval. Handover interval when handing over from the parent cell to the sub-cell is in fact the minimum value of the delta-t.

Figure 15:
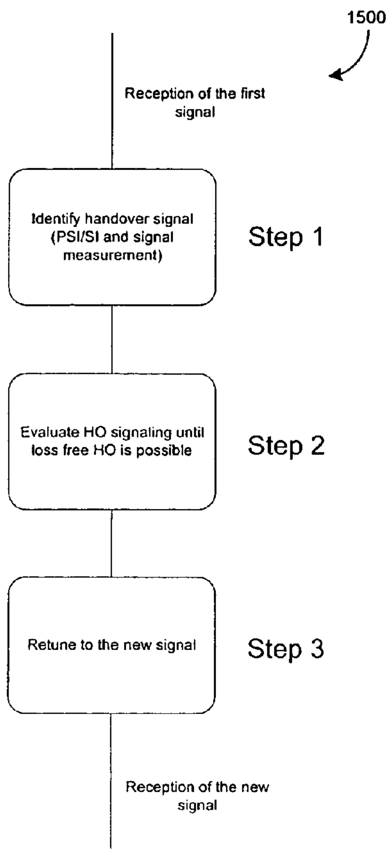
FIG. 15 is a representation of a network signaling process for synchronizing payload data of signals 1 and 2 in FIG. 6.

The behavior of the terminal 200, shown in FIG. 2, is described in a process 1500 shown in FIG. 15, as follows:

Step 1: The terminal identifies the handover signal described in the PSI/SI portion of the frame and performs a signal measurement.

Step 2: The Handover Over (HO) signal is evaluated until a loss free HO is possible.

Step 3: The terminal retunes to and receives the new signal.

In the network, there are two implementation requirements for the transmitters:

(a) synchronization of the payload (useful data).

(b) handover data (handover interval) synchronization.

Figure 16:
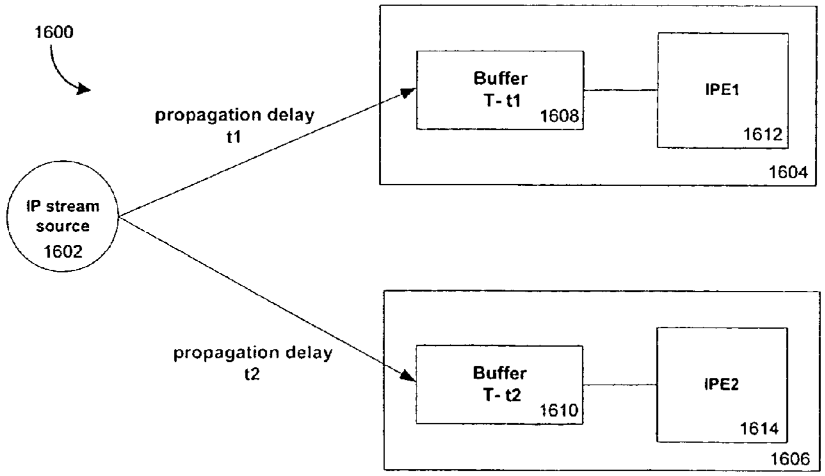
FIG. 16 is a representation of a network signaling process for synchronizing handover data for signals 1 and 2 in FIG. 6.

Payload synchronization 1600, as shown in FIG. 16, can be achieved from an IP stream source 1602 by compensating propagation delays t1 and t2 in transmitters 1604 and 1606, via buffers 1608 and 1610, coupled to IP Encapsulators 1612 and 1614. The Encapsulators encapsulate IP packets into an MPEG-2 transport stream e.g. per DVB and Advanced Television Standards Committee (ATSC) specifications. In order to insert the correct handover data into the stream, the Encapsulator must be aware of the start time of the next MPE-FEC frame of a certain elementary stream on the neighbor signals. This implies a dedicated interface between the Encapsulators to be built.

Figure 17:
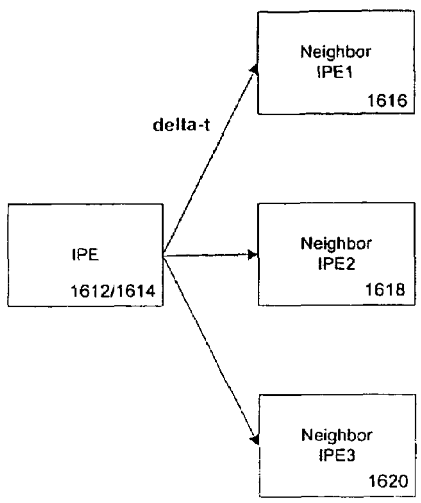
FIG. 17 is a representation of signaling for handover in a non-time sliced based DVB-H service.

In FIG. 17, the signaling on this interface 1612 or 1614 can carry the delta-t information that is inserted into the MPE-FEC section at a given moment along with an identifier of the elementary stream (service). Based on this information the neighbor Encapsulator 1616, 1618, 1620 can calculate the available handover interval to this particular signal produced by the first Encapsulator.

Figure 18:
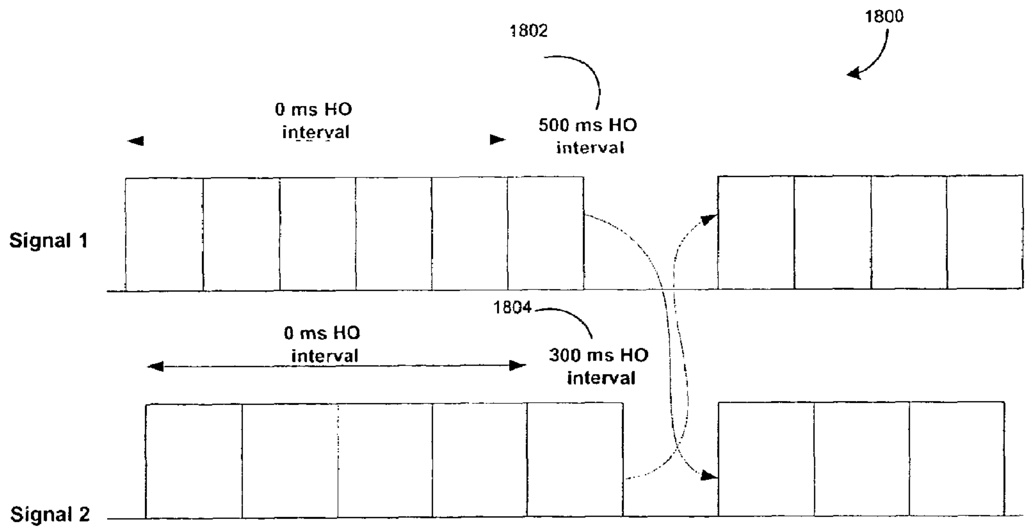
FIG. 18 is a representation of signaling for handover in a non-time sliced DVB-H service including a forced and synchronized handover internal.

In the case of non-time sliced DVB-H services 1800, shown in FIG. 18, a forced and synchronized handover interval has to be introduced, as shown in FIG. 18. Signal 1 has a 500 ms HO interval 1802 while signal 2 has a 300 ms HO interval 1804. Signal 1 is able to switch to Signal 2 within the 300 ms interval and signal 2 is able to switch to signal 1 in the 500 ms HO interval. One important drawback of this solution is that buffering is required on the receiver side to deal with the silent (off) intervals imposed by the handover interval, even when the terminal is not executing a handover. Such buffering is unneeded in a normal case.

While the invention has been described in preferred embodiments, various changes can be made therein without departing from the spirit and scope of the invention, as described in the appended claims, in which:

We claim:

1. A method for guaranteed and loss free handover for a handheld terminal roaming in a digital broadcast network, comprising:

a) a handheld terminal roaming in a digital broadcast network and a current signal receiving services in a current cell;

b) identifying handover signals by real-time signaling carried within a data frame along with useful data and having retune intervals for guaranteed handover providing the same services in target cell, wherein the data frame is a multi protocol encapsulation/forward error correction (MPE/FEC) frame;

c) evaluating the retune intervals for handover signals until loss free handover is determined; and d) providing guaranteed and loss free handover from the current signal to the target signal in response to b) and c).

2. The method of claim 1 further comprising:

e) identifying handover signal by static signaling carried in the digital broadcast signaling.

3. The method of claim 2 wherein the signaling comprises data in program specific information PSI tables of a digital video broadcast (DVB) system.

4. The method of claim 1 further comprising:

a) constructing a handover signaling table (HST) containing the mapping of real-time handover signals to handovers that are possible from signals that are transporting an actual transport stream and specifying guaranteed handover intervals for target transport streams:

b) storing the HST in data structures carrying program specific and/or service information in a digital broadcast network;

c) identifying handover signals from the said data structures for a handheld terminal receiving a current signal and services;

d) conducting signal measurements for handover signaling until loss free handover is possible for a target signal receiving the same services as the current signal; and e) retuning the handheld terminal from the current signal to the target signal with guaranteed and loss free handover.

5. The method of claim 4 wherein the data structures are PSI and service information (SI) tables of a DVB system.

6. The method of claim 1 further comprising:

e) synchronizing means synchronizing payload data in the current cell and the target cell during a handover interval.

7. The method of claim 6 further comprising:

f) calculating means calculating the handover interval between the current cell and the target cell.

8. The method of claim 7 wherein the calculating means is an encapsulator in the current cell and the target cell.

9. Apparatus, comprising:

a) a receiver receiving a current signal receiving services in a current cell in a digital broadcast network;

b) a processor configured for:

c) identifying handover signals in a target cell receiving the same services by real-time signaling carried within a data frame along with useful data, the handover signals having retune intervals for guaranteed handover, wherein the data frame is a multi protocol encapsulation/forward error correction (MPE/FEC) frame;

d) evaluating the retune intervals for handover signals in the target cell until loss free handover is determined, and e) providing guaranteed and loss free handover from the current signal to a target signal receiving the same services in response to the identifying and evaluating.

10. The apparatus of claim 9 wherein handover signals are identified by static signaling carried in the PSI tables of the digital video broadcast (DVB) signaling.

11. The apparatus of claim 9 wherein the services are time-sliced transmission in the digital broadcast system.

12. The apparatus of claim 9 wherein the services are non-time sliced transmissions in the digital broadcast system.

13. The apparatus of claim 9 wherein a forced and synchronized handover interval is introduced in the current and target signals.

14. A computer readable medium encoded with a computer program, executable in a computer system, comprising:

a) program code for a handheld terminal roaming in a DVB network and receiving services in a current cell;

b) program code for identifying handover signals providing the same services in a target cell ,by real-time signaling carried within a data frame along with useful data, the handover signals having retune intervals for guaranteed handover, wherein the data frame is a multi protocol encapsulation/forward error correction (MPE/FEC) frame;

c) program code for evaluating the retune intervals for the handover signals until loss free handover is determined in a target signal, and d) program code for providing guaranteed and loss free handover from the current cell to the target signal in response to the identifying and evaluating.

* * * * *